(12) United States Patent
White

(10) Patent No.: US 6,814,823 B1
(45) Date of Patent: Nov. 9, 2004

(54) OBJECT CONSOLIDATION THROUGH SEQUENTIAL MATERIAL DEPOSITION

(75) Inventor: Dawn White, Ann Arbor, MI (US)

(73) Assignee: Solidica, Inc., Ann Arbor, MI (US)

( * ) Notice: Subject to any disclaimer, the term of this patent is extended or adjusted under 35 U.S.C. 154(b) by 415 days.

(21) Appl. No.: 10/088,040

(22) PCT Filed: Sep. 15, 2000

(86) PCT No.: PCT/US00/25211

§ 371 (c)(1),
(2), (4) Date: Mar. 14, 2002

(87) PCT Pub. No.: WO01/20534

PCT Pub. Date: Mar. 22, 2001

Related U.S. Application Data

(60) Provisional application No. 60/157,572, filed on Oct. 4, 1999, provisional application No. 60/156,251, filed on Sep. 27, 1999, provisional application No. 60/155,615, filed on Sep. 23, 1999, and provisional application No. 60/154,250, filed on Sep. 16, 1999.

(51) Int. Cl.$^7$ ............................................. G06F 19/00
(52) U.S. Cl. ..................... 156/73.1; 156/73.5; 700/119; 700/123
(58) Field of Search ................. 156/64, 73.1, 73.5, 156/272.2; 700/117, 118, 119, 120, 121, 122, 123, 182

(56) References Cited

U.S. PATENT DOCUMENTS

| | | | | |
|---|---|---|---|---|
| 3,932,923 A | 1/1976 | DiMatteo | ...................... | 29/407 |
| 3,959,747 A | 5/1976 | Turski et al. | ................. | 333/30 |
| 4,285,752 A | 8/1981 | Higgins | ....................... | 156/250 |
| 4,327,156 A | 4/1982 | Dillon et al. | ............... | 428/568 |
| 4,419,170 A | 12/1983 | Blad | .......................... | 156/361 |
| 4,575,330 A | 3/1986 | Hull | ........................ | 425/174.4 |
| 4,665,492 A | 5/1987 | Masters | ..................... | 364/458 |
| 4,743,733 A | 5/1988 | Mehta et al. | .......... | 219/121.66 |
| 4,752,352 A | 6/1988 | Feygin | ........................ | 156/630 |
| 4,786,267 A | 11/1988 | Toya et al. | .................... | 445/7 |
| 4,863,538 A | 9/1989 | Deckard | .................... | 156/62.2 |
| 5,015,312 A | 5/1991 | Kinzie | .......................... | 156/63 |
| 5,088,047 A | 2/1992 | Bynum | .................... | 364/474.24 |
| 5,121,329 A | 6/1992 | Crump | ....................... | 364/468 |
| 5,126,529 A | 6/1992 | Weiss et al. | ............. | 219/121.6 |
| 5,182,056 A | 1/1993 | Spence et al. | ................ | 264/22 |
| 5,203,944 A | 4/1993 | Prinz et al. | ................. | 156/247 |
| 5,207,371 A | 5/1993 | Prinz et al. | ................. | 228/125 |
| 5,236,637 A | 8/1993 | Hull | ........................... | 274/22 |
| 5,252,163 A | 10/1993 | Fell | ............................ | 156/205 |
| 5,256,340 A | 10/1993 | Allison et al. | ............... | 264/22 |
| 5,260,009 A | 11/1993 | Penn | ......................... | 264/40.1 |
| 5,263,130 A | 11/1993 | Pomerantz et al. | ......... | 395/118 |
| 5,286,573 A | 2/1994 | Prinz et al. | ................. | 428/457 |
| 5,287,435 A | 2/1994 | Cohen et al. | ............... | 395/118 |
| 5,301,415 A | 4/1994 | Prinz et al. | .................. | 29/458 |
| 5,303,141 A | 4/1994 | Batchelder et al. | ......... | 364/149 |

(List continued on next page.)

*Primary Examiner*—James Sells
(74) *Attorney, Agent, or Firm*—Gifford, Krass, Groh, Sprinkle, Anderson & Citkowski, PC

(57) ABSTRACT

A system and a method of fabricating a three-dimensional object consolidates material increments in accordance with a description of the object using a process that produces an atomically clean faying surface between the increments without melting the material in bulk. The CAD system (60) interfaces with a numerical controller (70), which controls an actuation system. The actuation system brings the support feed unit (62) the support ultrasonic welding unit (66), the object feed unit (64) and the object ultrasonic welding unit (68) into proper position in the work area (75), so that the ultrasonic consolidation of the layers takes place according to the CAD description of the object. In alternative embodiments, electrical resistance, and frictional methodologies are used for object consolidation. The invention further facilitates the construction and repair of dense objects, including fiber-reinforced composites and aerospace structures.

35 Claims, 10 Drawing Sheets

U.S. PATENT DOCUMENTS

| | | | |
|---|---|---|---|
| 5,354,414 A | 10/1994 | Feygin | 156/630 |
| 5,398,193 A | 3/1995 | deAngelis | 364/468 |
| 5,470,651 A | 11/1995 | Milinkovic et al. | 428/325 |
| 5,514,232 A | 5/1996 | Burns | 156/64 |
| 5,578,227 A | 11/1996 | Rabinovich | 219/121.63 |
| 5,594,652 A | 1/1997 | Penn et al. | 700/119 |
| 5,614,075 A | 3/1997 | Andre, Sr. | 205/67 |
| 5,617,911 A | 4/1997 | Sterett et al. | 164/457 |
| 5,637,175 A | 6/1997 | Feygin et al. | 156/264 |
| 5,669,433 A | 9/1997 | Sterett et al. | 164/46 |
| 5,718,951 A | 2/1998 | Sterett et al. | 427/466 |
| 5,730,817 A | 3/1998 | Feygin et al. | 156/64 |
| 5,746,844 A | 5/1998 | Sterett et al. | 148/522 |
| 5,771,524 A | 6/1998 | Woods et al. | 15/209.1 |
| 5,779,833 A | 7/1998 | Cawley et al. | 156/89.11 |
| 5,787,965 A | 8/1998 | Sterett et al. | 164/155.3 |
| 5,816,472 A | 10/1998 | Linn | 228/1.1 |
| 5,817,199 A | 10/1998 | Brennecke et al. | 156/73.1 |
| 5,851,665 A | 12/1998 | Marcus | 428/357 |
| 5,876,550 A | 3/1999 | Feygin et al. | 156/264 |
| 5,879,489 A | 3/1999 | Burns et al. | 156/64 |
| 5,884,835 A | 3/1999 | Kajiwara et al. | 228/110.1 |
| 5,894,983 A | 4/1999 | Beck et al. | 228/110.1 |
| 5,897,825 A | 4/1999 | Fruth et al. | 264/401 |
| 5,931,372 A | 8/1999 | Miller | 228/180.5 |
| 5,945,058 A | 8/1999 | Manners et al. | 264/401 |
| 5,960,853 A | 10/1999 | Sterett et al. | 164/271 |
| 5,976,339 A | 11/1999 | Andre, Sr. | 205/70 |
| 6,007,318 A | 12/1999 | Russell et al. | 425/130 |
| 6,129,872 A | 10/2000 | Jang | 264/75 |
| 6,129,884 A | 10/2000 | Beers et al. | 264/401 |
| 6,136,252 A | 10/2000 | Bedal et al. | 264/308 |
| 6,176,953 B1 | 1/2001 | Landreth et al. | 156/73.3 |

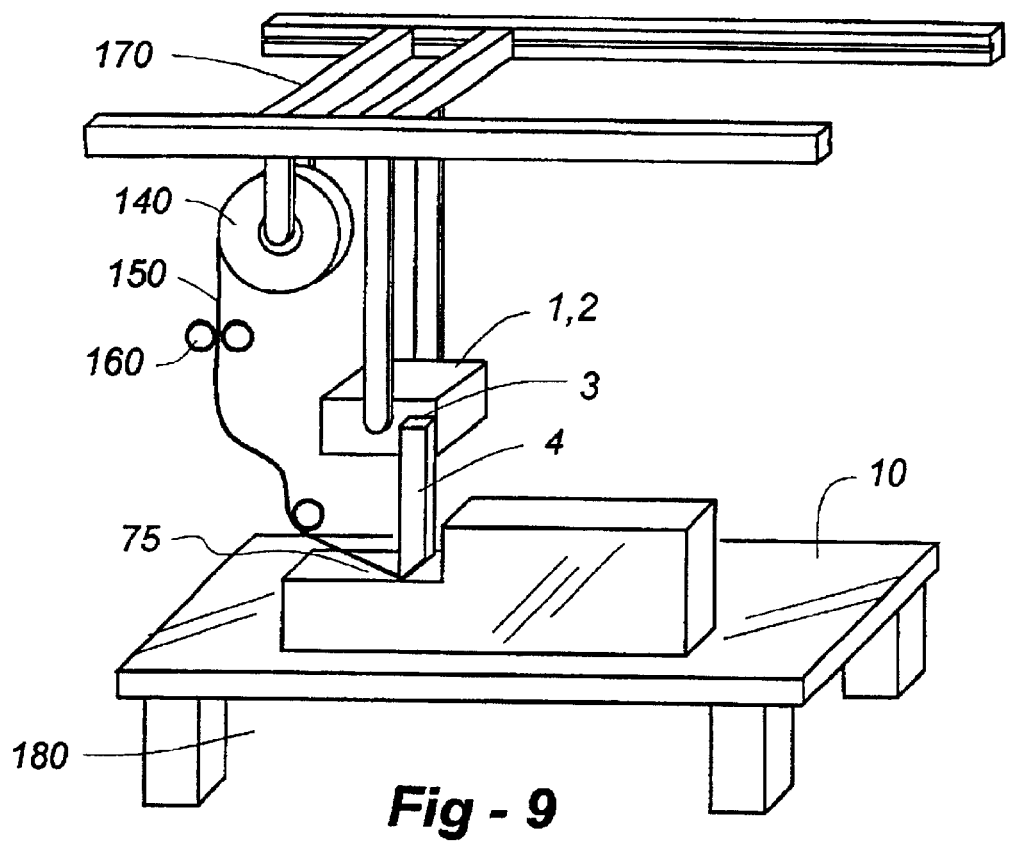
Fig - 9
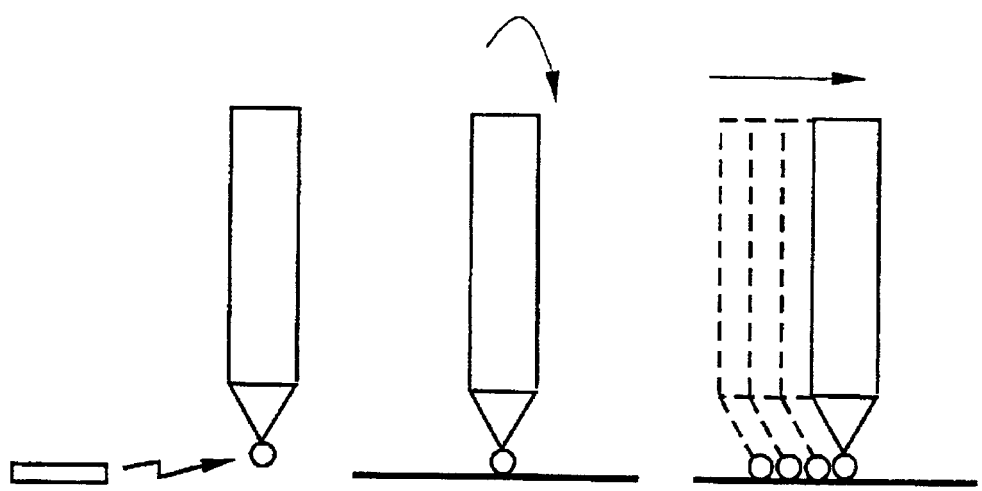
Fig - 10A  Fig - 10B  Fig - 10C

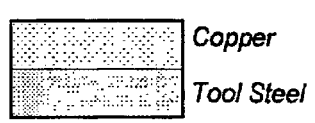
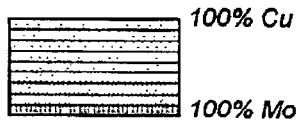
*Fig - 14A*   *Fig - 14B*   *Fig - 14C*
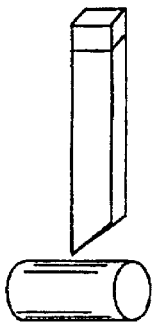
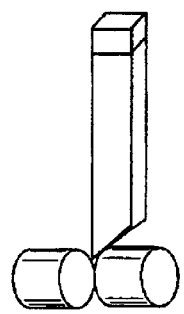
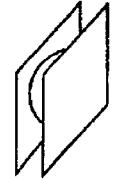
*Fig - 15A*   *Fig - 15B*   *Fig - 15C*
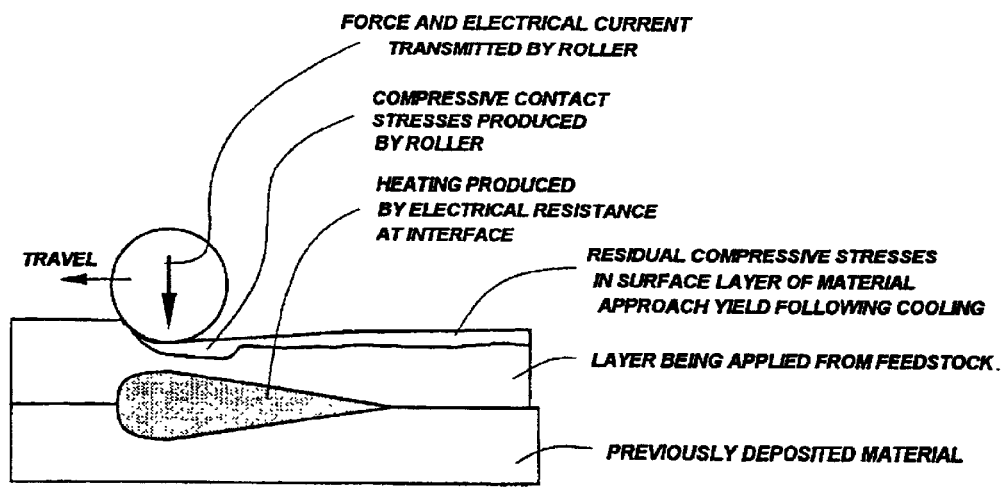
*Fig - 16*

OBJECT CONSOLIDATION THROUGH SEQUENTIAL MATERIAL DEPOSITION

This application claims benefit of Provisional Appls. 60/154,250 filed Sep. 16, 1999, 60/155,615 filed Sep. 23, 1999, 60/156,251 filed Sep. 27, 1999 and 60/157,572 filed Oct. 4, 1999.

FIELD OF THE INVENTION

The present relates generally to fabrication of object and prototypes through the sequential deposition of material. More particularly, the invention relates to object fabrication using ultrasonic, electrical resistance, and frictional consolidation methodologies.

BACKGROUND OF THE INVENTION

Numerous manufacturing technologies exist for producing objects sequentially adding material, with the casting of liquid metal being perhaps the oldest such technique. In the past two decades, however various processes for fabricating objects to net shape primarily through material addition, i.e. without a finishing step such as machining to produce detailed, high-precision features, have been patented and, in a few cases, commercialized.

Most of these additive manufacturing processes either rely on an adhesive, or a solidification process in order to produce a bond between previously deposited material and each incremental volume of material which is added. Although the use of adhesives is convenient, the properties of the adhesive control the properties of the finished object, and the limits the usefulness of such processes in the production of engineering parts and products.

Particularly with regard to the production of metal objects, prior-art methods based on solidification transformation require to presence of liquid metal. Various approaches to the problem include three-dimensional shape melting or shape welding as described by Edmonds, U.S. Pat. No. 4,775,092, Doyle et al., U.S. Pat. No. 4,812,186, and Prinz et al., U.S. Pat. No. 5,207,371, and laser melting and deposition of powders as described in Lewis et. al, U.S. Pat. No. 5,837,960. Brazing of laminated objects, and closely related to it, infiltration of a low-surface tension and low-melting point alloy to fill voids in objects made by compacting or printing metal powders have also been employed, see U.S. Pat. No. 5,807,437 to Sachs; U.S. Pat. No. 5,872,714 to Shaikh; and U.S. Pat. No. 5,354,414 to Feygin. All of these processes require high temperatures and formation of liquid metals to produce a metal part The presence of liquid metal in a process presents numerous safety and material handling problems. In addition, the presence of liquid metal in additive manufacturing processes may detrimentally effect dimensional accuracy of a part when built. The dimensional changes which occur during the liquid-solid transformation in metals are not wholly consistent, and are subject to random noise, see "Effects of Random Noise Shrinkage on Rapid Tooling Accuracy," by Paul Jacobs, *Materials & Design*, Vol. 21, No. 2, April 2000, pp. 127–136. This noise results in unpredictable and uncontrollable dimensional inaccuracies. As part size increases, the errors accumulate, making it impossible to produce accurate parts. Several solutions have been proposed, including the use of a second, subtractive step for addressing the accuracy issues. However, this adds time, cost, and complexity to the process.

The only commercialized low-temperature process for additive manufacturing of engineering scale metal components is electroforming, or plating. In the electroforming process, metal salts are dissolved in an aqueous solution. When an electrical current passes through this bath, metal is deposited on the negatively charged surface, which, in net shape electroforming applications such as tooling, is a model which is the inverse of the desired final shape. As a near net-shape forming technology, electroforming has certain drawbacks including extremely low deposition rate, the need to machine or otherwise produce an accurate mandrel or form, and the generation of toxic liquid and sludge by products.

Novel processes for additive manufacturing of net shape objects composed of metals are clearly needed. The technologies noted above are limited in their capability, use expensive equipment, and typically have safety hazards associated with the presence and handling of lasers, liquid metals and powders.

SUMMARY OF THE INVENTION

This invention is directed to a system and a method of fabricating an object by consolidating material increments in accordance with a description of the object using a process that produces an atomically clean faying surface between the increments without melting the material in bulk. In alternative embodiments, ultrasonic, electrical resistance, and frictional methodologies are used for object consolidation.

The material increments are placed in position to shape the object by a material feeding unit. The raw material may be provided in various forms, including flat sheets, segments of tape, strands of filament or single dots cut from a wire roll. The material may be metallic or plastic, and its composition may vary discontinuously or gradually from one layer to the next, creating a region of functionally gradient material. Plastic or metal matrix composite material feedstocks incorporating reinforcement materials of various compositions and geometries may also be used.

If excess material is applied due to the feedstock geometry employed, such material may be removed after each layer is bonded, or at the end of the process; that is after sufficient material has been consolidated to realize the final object. A variety of tools may be used for material removal, depending on composition and the target application, including knives, drilling or milling machines, laser cutting beams, or ultrasonic cutting tools.

The material increments are fed sequentially and additively according to a computer-model description of the object, which is generated by a computer-aided design (CAD) system, preferably on a layer-by-layer basis. The CAD system, which holds the description of the object, interfaces with a numerical controller, which in turn controls one or more actuators. The actuators impart motion in multiple directions. Three orthogonal directions may be used or five axes, including pitch and yaw as well as XYZ, may be appropriate for certain applications, so that each increment (i.e., layer) of material is accurately placed in position and clamped under pressure.

The system and method may incorporate the use of support materials to provide suitable substrates for any features of the object, which, when viewed sectionally, are overhanging. A description of the support resides in the CAD system, enabling the support to be built sequentially and additively. The support is preferably composed of less valuable material which is removed by stripping, cutting, dissolution, or by melting, when material having a lower melting-point than that of the object is used.

As examples, useful support materials include ceramics, particularly rapidly curing, water-soluble ceramics, and metal foils which do not bond but can be compressed so as to hold up the build portion. The support materials may be consolidated using the same power supply and different joining parameters, though not every layer or increment of the support need be bonded to the next layer, nor does the support need be fully consolidated. Indeed, weakly or partially bonded support material may be removed by breaking it up and shaking it loose using ultrasonic vibrations of appropriate frequency.

Other embodiments of the invention are directed to fabricating fiber-reinforced composites, including composites with continuous ceramic fibers in a metal matrix. According to one aspect, a layer of fibers is covered with a layer of a metallic powder, the surface of which is then partially consolidated by sweeping the surface with a laser beam. Full consolidation is effected using ultrasonic, electrical resistance, or frictional bonding techniques.

Another aspect is directed to fabricating an object by tape lay-up. Tape from a spool is fed and cut into segments to create successive sections of the object, the direction of the tape segments preferably alternating between two orthogonal directions from section to section. Material may also be provided in the form of wire or strip fed from a spool. Such a configuration is particularly applicable to repairing and overhauling worn or damaged regions of an object

BRIEF DESCRIPTION OF THE DRAWINGS

FIG. 7 is a schematic diagram illustrating an embodiment of the invention in which the material layers are tape segments;

FIG. 9 is a schematic diagram illustrating an embodiment of the invention in which the material layers are dots of wire;

FIG. 10a is a drawing which shows how a small ball or dot of material may be produced for use by the invention;

FIG. 10b is a drawing which shows how the ball or dot is deposited on a surface;

FIG. 10c is a drawing which shows the tool use to form the ball or dot is withdrawn;

FIG. 14a illustrates a discontinuous change in material composition;

FIG. 14b illustrates a gradual change in material composition;

FIG. 14c shows a gradual change in material composition produced by the dot-wise application of two distinct materials;

FIG. 15a shows how a sonotrode and feedstock are aligned for cutting;

FIG. 15b illustrates a feedstock being severed;

FIG. 15c depicts a bonded increment of material having a shape dictated by sonotrode geometry and motion;

FIG. 16 is a side-view drawing in partial cross-section which illustrates a resistance-based object consolidation process according to the invention;

DETAILED DESCRIPTION OF THE INVENTION

The subject invention is directed to the creation of three-dimensional objects by depositing and consolidating successive layers of material, preferably under pressure, using energy applied at material contact point or "faying" surfaces between adjacent layers. In alternate embodiments, the energy may be supplied in the form of ultrasonic energy, resistance heating or frictional force. The invention is applicable to non-metals, but when applied to metals, a true metallurgical bond is created at the interface, although no bulk melting of the previously deposited layers, or the material increments being added is involved. The consolidation of the metal-metal interface occurs in a solid (dry) state environment, and it is therefore a clean and safe process requiring no dies or molds.

A characteristic of solid state bonding processes such as ultrasonic, resistance and friction joining is that the temperature rise at the interface during welding is below the melting point. The joining temperature may be as low as 35–50% of the melting point, for some metals during ultrasonic welding, or up to 90% of the melting point during resistance joining, and heating is typically confined to a region 5 to 200 microns thick. Rapid heat dissipation from the region of bonding ensures that minimal residual stresses arise. As such, post-processing to relieve residual stresses is typically not necessary. Similarly, a liquid-solid phase transformation is avoided, and the final product has improved dimensional accuracy and resistance to fatigue and cracking. Due to the low-temperature, solid-state nature of the ultrasonic consolidation process, specifically, energy costs are as much as 95% less than in competing technologies, allowing the process to be practiced in facilities such as offices which do not have high-voltage electrical service.

The invention will now be described in detail with reference to the figures. The specification will also be subdivided with respect to the alternative methodologies described herein, namely, ultrasonic, resistance, and frictional bonding.

Ultrasonic Consolidation

Figure 1:
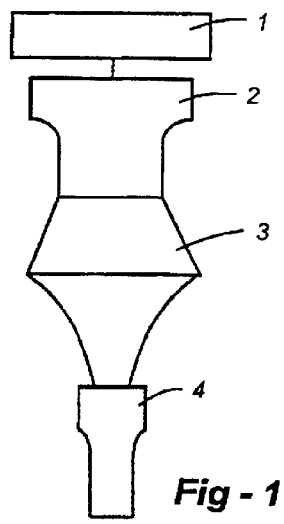
FIG. 1 is a schematic diagram showing the components of an ultrasonic welding unit applicable to the invention.

The main components of an ultrasonic welding unit adapted for use by the invention are shown schematically in FIG. 1. An ultrasonic generator or power supply 1 receives main grid electricity at a low frequency, preferably in the range of 50 to 60 Hz, and at a low voltage of 120V or 240 V AC. The generator converts the input to an output at a higher voltage, preferably having a frequency in the range of 15 to 60 kHz. A useful working frequency is 20 kHz, which is above the normal range of human hearing of about 18 kHz. Systems employing higher frequencies of 40 kHz to 60 kHz with lower amplitude vibrations are preferably employed for fragile materials, such as very thin foils, wires of very small diameter, or substrates which are easily damaged.

The high frequency output of the generator is transmitted to a transducer or converter 2, which converts the signal to mechanical vibratory energy at the same ultrasonic frequencies. State-of-the art transducers operate on piezoelectric principles and incorporate discs or rings made of piezoelectric material, such as piezoelectric ceramic crystals, which are compressed between two metal sections. An advanced generator features automatic tuning adjustment in relation to the transducer so that a constant amplitude of vibration is maintained during the operation of the welding unit.

The peak-to-peak amplitude of the vibration is 20 microns (0.0008 in.) for a typical 20 kHz transducer and 9 microns (0.00035 in.) for a 40 kHz transducer. If a different amplitude is required, a booster 3 is attached to the transducer. The vibratory energy of the transducer is transmitted to the booster 3, which decreases or increases the amplitude of the ultrasonic waves. The waves are then transmitted to the horn, which is a custom-made acoustic tool that comes in contact with the workpieces. The horn is also called a sonotrode or head unit. The horn may be designed as a tool-holder carrying a tool bit, or it may be provided in one integrated piece incorporating specific geometric features.

For ultrasonic welding of plastics, the sonotrode is made from aluminum or titanium. For ultrasonic welding of metals the sonotrude is preferably made of tool steel, although titanium may be used, and it may be manufactured as a unitary component.

The workpieces or layers are held under pressure between the contact surface of the sonotrode and a substrate or anvil. The contacting surfaces of the sonotrode and anvil are preferably roughened to provide a secure grip. Pneumatically operated jaws or other fixtures are used to insert and remove the parts to be joined, typically in conjunction with automated feeding mechanisms and automated positioning controllers.

Figure 2:
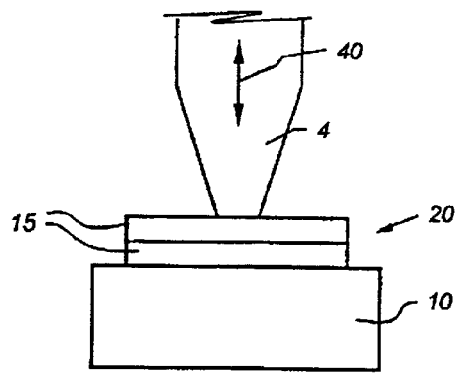
FIG. 2 shows a schematic ultrasonic welding process for plastics according to the invention.

A basic ultrasonic welding arrangement suitable for plastics is shown in FIG. 2. Two layers of plastic 15 are clamped under pressure between an anvil 10 and a sonotrode 4, which transmits vibrations 40 in a direction perpendicular to the common surface 20 of the layers 15 to be joined. When the invention is used to form objects made of plastic materials, the heating generated at the interface of successive layers is high enough to cause plastic flow and localized melting of the layers. The plastic materials, which may be used for forming objects by the present method, include the class of thermoplastics, either amorphous or semicrystalline. Common amorphous polymer materials, which may be ultrasonically consolidated or bonded, include acrylic, polycarbonate, polystyrene, PVC and ABS. Amorphous thermoplastics do not have a defined melting point, but gradually flow under heating, and gradually solidify when heating is removed. Common semicrystalline polymers, which may be ultrasonically consolidated, include nylon, polyester, polyethylene, polypropylene, acetal, polyetherimide and polyphenylene sulfide. Semicrystalline polymers have a well-defined melting point, which must be reached for the material to flow.

For plastic materials, the ultrasonic welder is preferably positioned so that the vibrations transmitted by the sonotrode are normal to the surfaces undergoing consolidation. The vibrations create frictional heating, which causes gradual localized plastic flow in amorphous plastics. When the vibrations stop, the gradual solidification process creates a seamless bond. For semicrystalline materials, higher amplitude vibrations are required in order for localized melting to occur.

Figure 3:
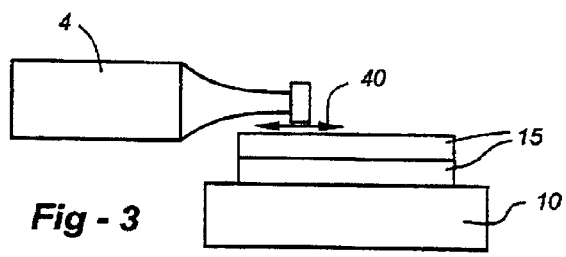
FIG. 3 shows schematically a basic ultrasonic welding process for metals.

FIG. 3 illustrates schematically the process of ultrasonic welding of metals. Two metal workpieces 15 are pressed together between the sonotrode 4 and the anvil 10. The lower piece is held stationary by the anvil, while the upper piece vibrates with the ultrasonic frequency imparted by the sonotrode. The vibration breaks up and removes oxides from the interface, resulting in an atomically clean surface. Pressure on the atomically clean interface, enhanced by the application of ultrasonic energy, causes diffusion of atoms to occur within a region of 10 microns on either side of the interface, resulting in a true metallurgical bond without melting, phase transformation or high energy.

In the fabrication of objects through additive manufacturing, the thickness of the layers is typically in the range of 0.001 to 0.005 inches, in order to achieve the desired dimensional accuracy. This is near the range of foil thickness to which ultrasonic joining of metals is best applied, and it is therefore perfectly suited for the purpose of ultrasonic consolidation of objects according to the invention. It is also possible to consolidate more than two layers of foil at a time, depending on their combined thickness, and the geometry of the part being additively fabricated.

Figure 4:
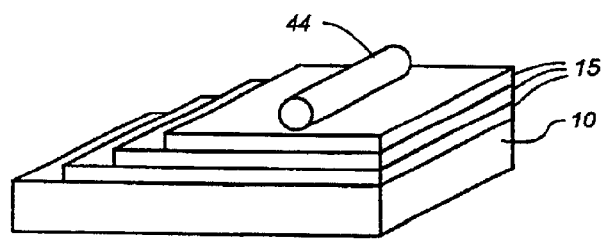
FIG. 4 is a schematic diagram illustrating an embodiment of the invention in which the material layers are sheets.

FIG. 4 shows an object being fabricated by successive consolidation of layers of material 15 provided in sheet form. The sonotrode has an end piece in the form of a roller 44 and applies the vibrations over the surface of each layer until the layer is consolidated with the one underneath. Foil material can be supplied in sheets or fed from a roll. The foil can be consolidated into layers and cut according to the required geometry following consolidation, or it can be cut first, then consolidated.

When the processes disclosed herein are used to produce features which are overhanging, cantilevered, or enclosed, a support material may be used to prevent the overhanging or enclosed feature from collapsing as material is added to the growing part. An exception would be the case wherein a filament or wire is used as a feedstock which is applied continuously, or as "dots" using five or more axes of motion in the work head or the build platform, such that material is always deposited on an essentially vertical surface, eliminating the need for supports.

Like most other free form fabrication processes, support structures are required when overhanging or enclosed features are to be fabricated. Because the methods described here require use of an applied load, these support structures must be capable of withstanding measurable compressive stresses—up to one or two thousand pounds per square inch in some cases. In addition, ultrasonic object consolidation requires that the support structure has a certain rigidity. In the case of ultrasonic joining, this is because the mechanism requires that material being deposited on an object being built, vibrate, under a slight load, at ultrasonic frequencies and very small amplitudes with respect to the surface on which it is being deposited. If the support structure effectively damps the applied vibrations, no bond will form between the previously deposited material and the increment of material being applied.

An ideal support material for free form fabrication will be low in cost, easily applied and easily removed, and will not interfere with the operation of the process. The requirement for rigidity in the support structure means that obvious support materials such as adhesive backed paper, or metal, and most plastics are unsuitable for use as support material, particularly during ultrasonic object consolidation, although they may be suited to the resistance and friction based object consolidation methods described herein.

Support materials may be applied around precut foils to supply a support structure, or applied in layers and consolidated, as necessary, by the same or another sonotrode, perhaps requiring adjustment depending upon the type of support material being used. When the entire process is fully automated, another ultrasonic welding unit may be dedicated entirely to fabricating the support structure, based on a layer-by-layer description of the support created by a CAD system which interfaces with a numerically-controlled actuation system. The actuators operate to control the relative motion of each sonotrode used, the object undergoing consolidation, any support material, and the anvil or substrate.

Different techniques may be used to supply support structures with sufficient rigidity for use with ultrasonic consolidation. These include low melting point alloys which can be ultrasonically consolidated. Certain tin alloys such as 96.5 Sn, 3.5 Ag; and 91 Sn, 9 Zn, for example, can be ultrasonically joined, as can brasses and other copper alloys. Low melting point alloys which can be ultrasonically joined, and which are melted readily at temperatures much lower than the melting point of engineering materials such as aluminum based, nickel based or iron based alloys, are good support alloys for ultrasonic object consolidation. Examples include 96.5 Sn, 3.5 Ag, 58 Bi, 42 Sn; and 77 Sn, 20 In, 3 Ag. There are a number of lead- and tin-based solders which can be ultrasonically joined, and have melting points of around 200° C. Many lead-based alloys are well suited, although a lead free alloy is more desirably employed for environmental reasons.

Another suitable support material for ultrasonic object consolidation is stainless steel. Although stainless steel is a high melting point material, it ultrasonically consolidates under conditions very different from those required to join non-ferrous material such as brasses or aluminum alloys. Thus, stainless steel shim stock, which has been roughened by grit blasting makes a good support material. Stainless steel shims in either sheet or tape widths can be cut to fit "unwanted" volumes under overhanging or enclosed features. When a build material such as an aluminum alloy or brass is consolidated above it, the stainless steel tapes will compress, forming a rigid support, but will not weld. When the build is completed, the tapes can be shaken out from around the wanted structure. Similarly, brass or aluminum shims, or foil made from a different ferrous alloy can be used as support when a stainless steel foil feedstock is being used to produce parts.

During resistance consolidation, foils having a very low electrical resistance, such as OFHC copper foils can be used as described above for a support structure. A resistance weld is produced at the highest resistance interface; since all materials except gold and silver have higher resistance than copper, this will provide an appropriate support. Very strong high melting point waxes are also support structure candidates. Some of these waxes are used in jewelry making, and can be deposited in empty volumes (enclosed features) or under cantilevered features. Similarly, certain ceramics, particularly solgels, and water soluble ceramics, or ceramics which are heavily filled with salt, which can be essentially slipcast incrementally into closed volumes are suitable for rigidly supporting a structure being built, and can be readily removed. Ceramic materials, since they are insulators, are also suitable to support resistance consolidation for additive manufacturing as well as frictional consolidation due to their rigidity.

Figure 6:
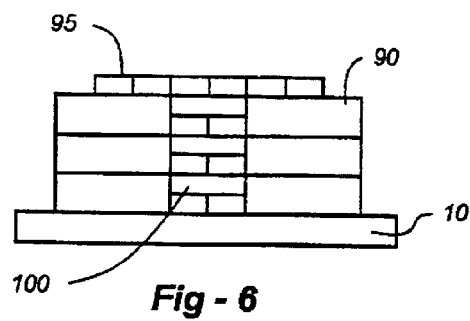
FIG. 6 illustrates the use of support materials to fabricate an object with overhanging parts.
Figure 5:
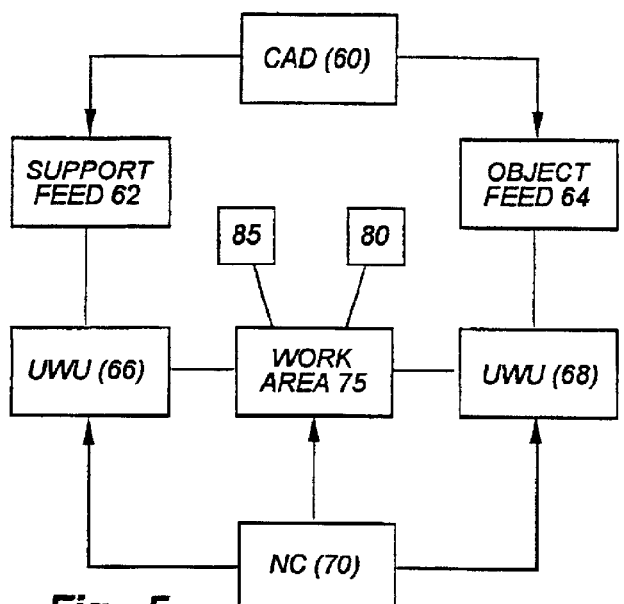
FIG. 5 is a schematic diagram of an automated system according to the invention.

FIG. 5 is a schematic representation of an automated system for fabricating objects according to the invention. Although discussed with reference to ultrasonic consolidation, most or all of the components are equally applicable to the resistive and frictional embodiments disclosed herein. In particular, one or both of the ultrasonic welding units 66 and 68 would be replaced by resistive or frictional consolidation apparatus, as disclosed in further detail below. A computer-aided design unit 60 provides a layer-by-layer description of the object and of the support, as needed. The object material is fed onto the work area 75 by an object-material feed unit 64. The support material is fed onto the work area 75 by a support-material feed unit 62. The feed units may be combined into one when the shapes of the object and support layers are compatible, for instance sheets of plastic are used for the support and sheets of aluminum foil for the object. In general, two different feed units are required. As shown in FIG. 6, the object may be fabricated by consolidating segments of tape 100 or filament or dots of material, as described below in other embodiments of the invention, while the support for overhanging parts 95 of the object may be constructed by adding layers of support material 90.

The object layers may be either precut, or excess feedstock may be removed by material removing unit 80, which could be a mechanical or ultrasonic knife, drill, or milling tool, or a laser beam. If used, support material may be removed by a removing unit 85. Sporadic ultrasonic spot-welding of the support material may be limited to the extent necessary to provide a rigid substrate for overhanging parts of the object, thereby facilitating rapid removal of the support by cutting through thin, unwelded sections of the support structure.

The CAD system 60 interfaces with a numerical controller 70, which controls an actuation system (not shown). The actuation system brings the support feed unit 62, the support ultrasonic welding unit 66, the object feed unit 64 and the object ultrasonic welding unit 68 into proper position in the work area 75, so that the ultrasonic consolidation of the layers takes place according to the CAD description of the object and support. The actuation system also controls the vertical motion of the substrate or anvil and the motion of any additional vertical clamps required by the application, so that clamping pressure may be applied on two layers undergoing consolidation.

Figure 7A:
FIG. 7a shows a stacking pattern for tape lay-up.

Feedstock in the form of sheets is often difficult to handle and maintain under uniform in-plane tension and pressure orthogonal to its plane; it may require very wide rollers to be fitted to the sonotrode, and successive passes of the roller to cover the entire sheet. A preferred approach with respect to wide objects is to build such an object from layers of material which are cut from a roll of tape. FIGS. 7*a* through 7*d* illustrate the building of an object by tape lay-up. FIG. 7*a* shows a typical lamination stacking pattern, in which the layers of tape forming one section of the object have a direction which is at a 90° angle with the direction of the layers of tape forming the next section of the object, or in which seams between adjacent tapes are offset in successive layers.

Figure 7B:
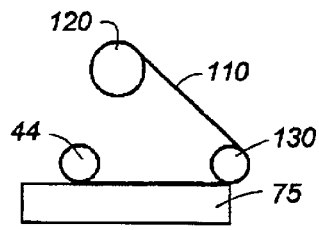
FIG. 7b shows a basic feed arrangement for tape stock.
Figure 7C:
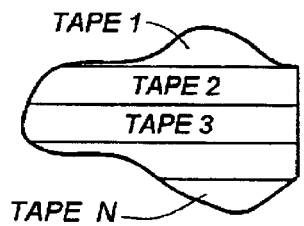
FIG. 7c is a drawing of a horizontal section of an object fabricated by tape lay-up.
Figure 7D:
FIG. 7d is a drawing of vertical section of an object fabricated by tape lay-up.

The set-up of the operation is shown in FIG. 7*b*. A feed spool 120 holds the tape 110, which passes through one or more tension tension rolls 130 and is fed on to the work area 75 to be consolidated with previous layers by the roller 44 of a sonotrode. The tape is usually 1 to 2 inches wide. FIG. 7*c* is a drawing of a horizontal section of the object showing adjacent tape segments and FIG. 7*d* is a drawing of a vertical section of the object showing the vertically stacked sections. Again, although FIGS. 7*a* through 7*d* are described with reference to ultrasonic consolidation, the set up and operation are applicable to other of the embodiments described herein through appropriate equipment adjustment. For example, the sonotrode roller 44 may be replaced with a friction acoustic bonding roller or rolling resistance welding electrode in accordance with the alternative methodologies disclosed herein.

In the case of ultrasonic consolidation, the vibrations are preferably transmitted in two orthogonal directions, namely, between the horizontal sections, and between the vertical surfaces of adjacent segments of tape forming each section. Such a configuration permits full consolidation, so that the bond lines which are visible in the stacking pattern of FIG. 7(*a*), are no longer visible after consolidation. In this embodiment, the layering and stacking may take advantage of automated tape-laying art methods combined with three-dimensional stacking techniques, including those of Off et al, U.S. Pat. No. 4,214,933 and DiMatteo, U.S. Pat. No. 3,932,923, which are incorporated herein by reference.

Figure 8:
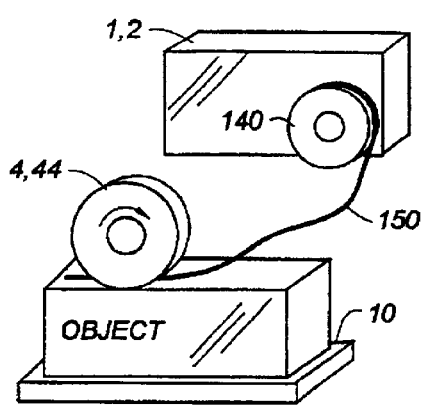
FIG. 8 is a schematic diagram illustrating an embodiment of the invention in which the material layers are pieces of filament.
Figure 17:
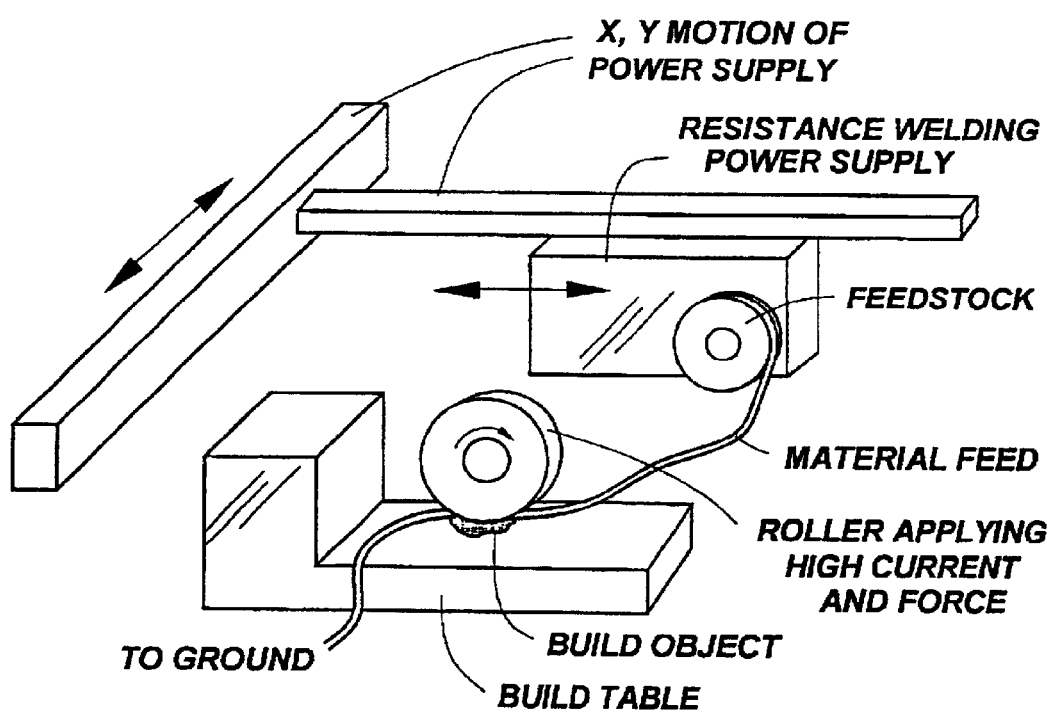
FIG. 17 illustrates a general approach to the application of a strip or wire to an object via resistance heating and pressure.
Figure 24:
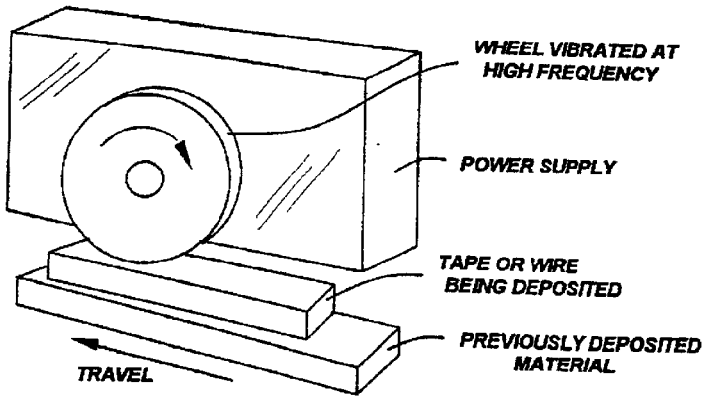
FIG. 24 illustrates the use of a wheel vibrated at high frequency in conjunction with a tape or wire to achieve a frictional acoustic bond according to the invention.
Figure 25:
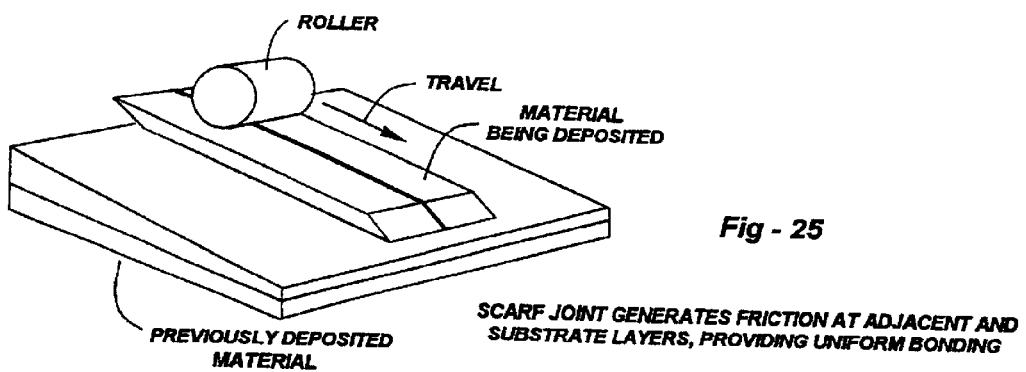
FIG. 25 illustrates how scarf joints may be generated at adjacent and subsequent layers to provide a uniform bonding.

FIG. 8 is a schematic diagram illustrating a different embodiment of the invention in which the material layers are in the form of tape, filament or wire 150, which is fed from a spool of wire 140. In the case of ultrasonic consolidation, the object is built on a substrate 10 and consolidated by a sonotrode 4 equipped with a roller head 44. In the case of friction acoustic or resistance bonding, a roller head 44 would be replaced with an appropriate mechanical unit as shown in FIGS. 24 and 25 with respect to friction acoustic bonding, or an electrical system for resistance bonding as shown in FIGS. 16 and 17. A numerical controller, not shown, allows an actuation system (not shown) to impart horizontal (XY) motion to the ultrasonic welding unit and the wire feed, and vertical (Z) motion to the substrate 10.

FIG. 9 is a schematic diagram illustrating yet a further deposition technique according to the invention in which the material layers are dots of wire. The wire 150 is stored in a spool 140 and passes through guide rolls 160 onto the work area 75 of the object being built. In the case of ultrasonic bonding, a sonotrode 4 has a tip designed to cut and bond dots of wire in 50–500 micron increments. The substrate 10 has a controlled motion 180 in the vertical direction, and the ultrasonic welding unit which includes the generator 1, convert 2 and booster 3 attached to the sonotrode 4 is mounted on a frame. 170 which imparts horizontal (XY) motion. The feedstock supply 140 is also mounted on the same frame 170 and has a controlled XY motion. In this application, a 40 kHz or 60 kHz ultrasonic power supply may be employed.

The point-wise application of dots of material, as illustrated in FIG. 9, allows the fabrication of objects requiring precise dimensioning and detailing, and it is particularly suited for building objects requiring application of materials with different composition. It is possible, for example, to join molybdenum (Mo) to both copper (Cu) and aluminum (Al), both of which are impossible to alloy or difficult to join with molybdenum using prior-art technologies. Mo—Cu compounds are often used for heat sink applications.

The method of material deposition employed in wire bonding can also be used in "dot wise" material application. As illustrated in FIG. 10*a*, wire bonding employs an electric arc to melt a small volume of material from a fine wire feedstock. This droplet detaches from the wire, and falls onto the workpiece (FIG. 10*b*), and the arc-generating tool is withdrawn (FIG. 10*c*). According to the invention, a small, low power ultrasonic horn with a small contact surface contacts the droplet and ultrasonically bonds it to the workpiece. By controlling the wire diameter, and the amount of energy in the arc, the droplet size can be controlled. Typical droplet dimensions are on the order of tens of microns. This process is used to bond wires to substrates in the electronics industry, and has not been used for free form fabrication. However, it has important advantages when employed as described here. A major advantage is the ability to produce very fine features in a wide range of materials.

In the case of solid free form fabrication, the droplets are formed and allowed to fall on the substrate, or on previously deposited material layers. They are located to overlap somewhat, so that when the ultrasonic horn contacts them and consolidates them, they deform and are forced into intimate contact with previously deposited material, eliminating voids and porosity from the consolidated structure. A precision motion platform capable of micron positioning and stepping of the type used in electronics fabrication is employed to ensure accurate droplet placement. The deposition approaches of FIGS. 9 and 10 are also applicable to the resistive and frictional embodiments of the invention with appropriate adjustment to the attendant apparatus, as described below.

Figure 11:
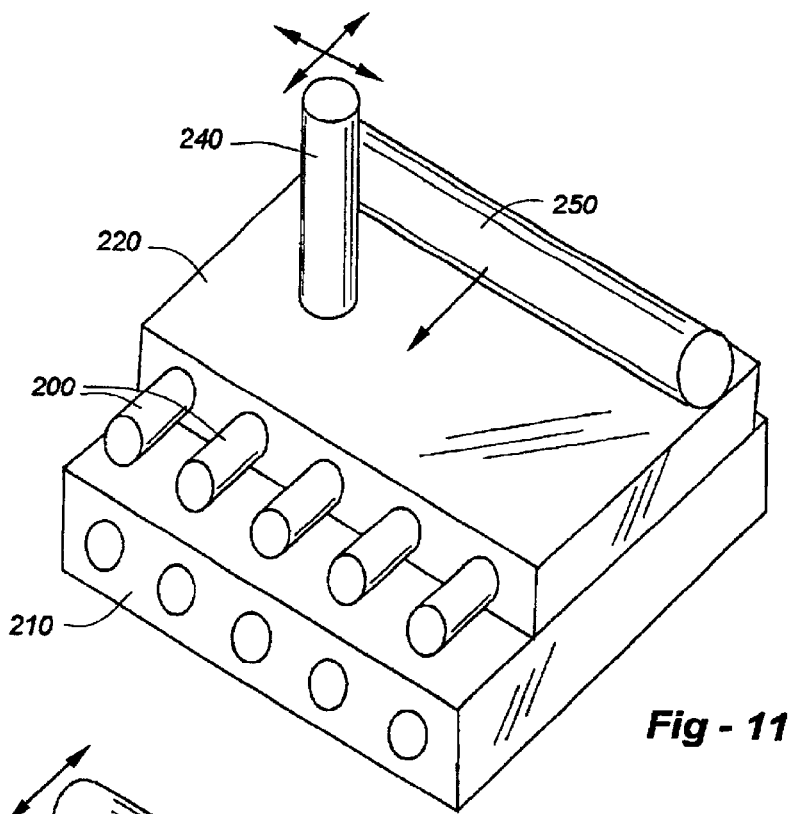
FIG. 11 is a schematic diagram illustrating an embodiment of the invention in which the fabricated object is a fiber-reinforced composite.

FIG. 11 is a schematic diagram illustrating an alternative embodiment of the invention in which the fabricated object is a fiber-reinforced composite. The reinforcing fibers 200 are preferably continuous ceramic fibers and the matrix is aluminum or another metal of interest, such as a nickel- or titanium-based alloy. First, a layer of fibers 200 is fed on the previously deposited material 210, and then aluminum powder 220 is deposited over to cover the layer of fibers up to a desired thickness. A laser beam 240 is passed of over the layer of powder sweeping the surface of the powder layer in two directions in a raster-type pattern.

The laser beam preferably forms part of a laser-aided direct metal deposition system, in which the powder is fed through the same nozzle as the laser beam. Such an arrangement is similar to a selective laser sintering system, in which the laser partially agglomerates a bed of previously deposited powder. The laser beam is only used to partially consolidate the surface of the powder layer. Full consolidation of the powder takes place at a second stage using one of the ultrasonic, resistive or frictional techniques described herein. In the case of ultrasonic bonding, full consolidation is achieved by passing a roller-tipped sonotrode 250 over the partially consolidated layer of powder. The process is then repeated until a fiber-reinforced object is built. The same process can be used to manufacture composite tape for use in other applications. This process combines the advantages of laser-aided direct metal deposition and ultrasonic welding. The laser beam 240 provides a surface that can support the function of the ultrasonic roller 250, and the ultrasonic roller consolidates the powder matrix 220 without high-temperature heating or melting. The advantage of this approach over free form consolidation via laser melting is elimination of thermal shock or molten metal erosion of the fibers.

Figure 12A:
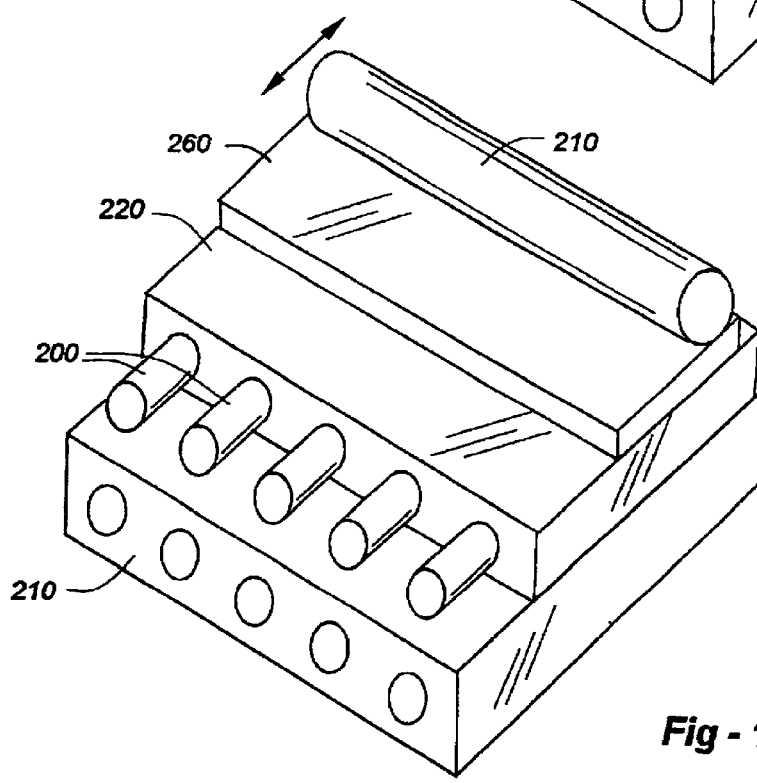
FIG. 12a is a schematic diagram illustrating an embodiment of the invention in which the fabricated object is a fiber-reinforced composite.
Figure 12B:
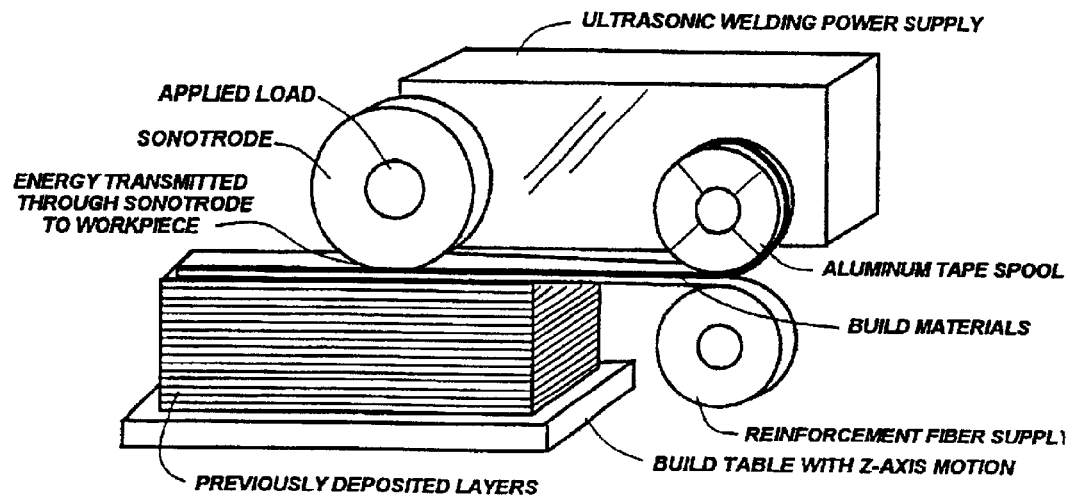
FIG. 12b is a simplified illustration of a system for fabricating a fiber-reinforced composite according to the invention using a ultrasonic consolidation.
Figure 12C:
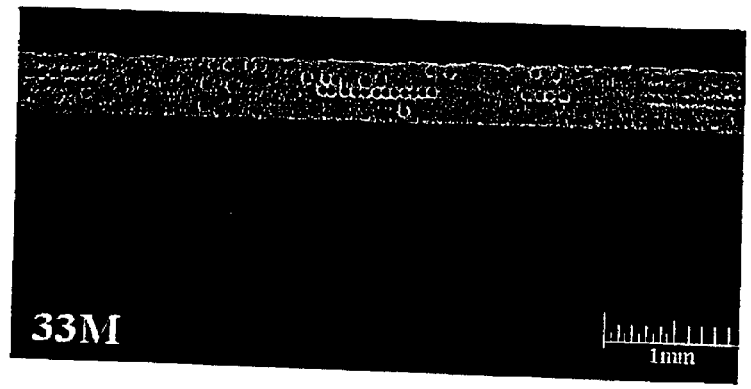
FIG. 12c is cross-section of a fiber-reinforced composite specimen produced using apparatus and methods disclosed herein.

FIG. 12a is a schematic diagram illustrating another alternative embodiment of the invention in which the fabricated object is a fiber-reinforced composite. FIG. 12b is a simplified illustration of a system for fabricating a fiber-reinforced composite, and FIG. 12c is cross-section of a fiber-reinforced composite specimen produced using apparatus and methods disclosed herein. Note that this process may avoid the use the laser beam altogether. The support for the ultrasonic roller 250 is provided in this embodiment by an aluminum foil 260. The roller 250 consolidates the powder and foil in one step, and the process is repeated. Again, the alternative methodologies of resistive and frictional consolidation may be applied by replacing the ultrasonic roller 250 with an appropriate roller or wheel consistent with friction acoustic or resistive bonding techniques.

The use of powder can also be eliminated as shown in FIG. 16. Here reinforcing fibers are sandwiched between two layers of the matrix metal (often Al or Ti) and the whole consolidated using ultrasonic, resistance or friction acoustic bonding.

Figure 13:
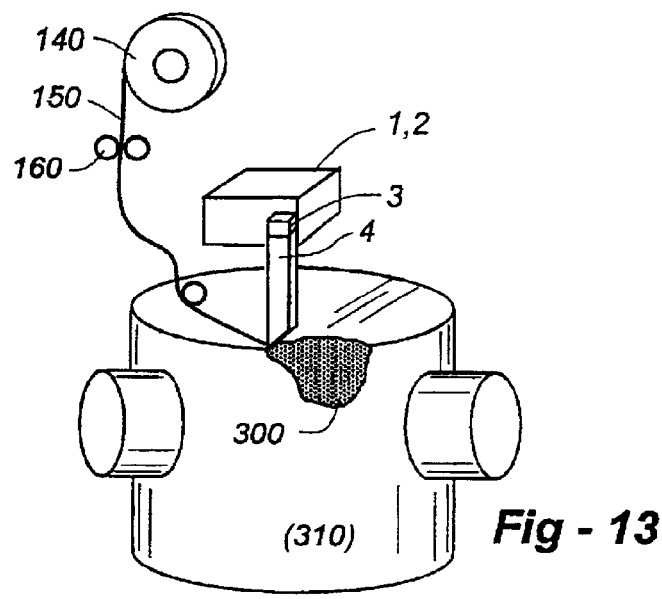
FIG. 13 is a schematic diagram illustrating an embodiment of the invention for repairing a worn region of an object.
Figure 26:
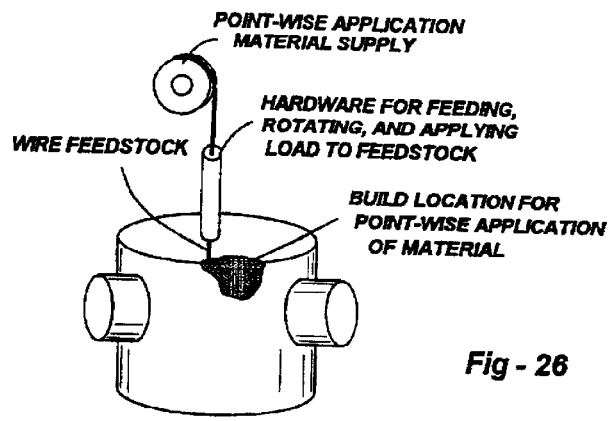
FIG. 26 illustrates, in simplified form, the use of frictional consolidation for overhaul and repair.

FIG. 13 is a schematic diagram illustrating a different alternative embodiment of the invention for repairing a worn region 300 of an object 310. To effect the repair, repair material filament 150 is fed from the spool 140 to the worn region under the sonotrode 4, which is equipped with a cutting tip, so that it cuts and consolidates small pieces of filament onto the worn region. Support material may be fed and consolidated, as needed, as described with respect to FIG. 6. Resistive and friction methodologies may also be used, as shown in FIG. 26 with respect to friction acoustic bonding, in particular.

The ultrasonic, resistive and frictional methodologies may also be used to create functionally gradient materials, as shown in FIG. 14. Indeed, the invention affords unique benefits as a means of preparing functionally gradient, net-shape objects in comparison to prior art. The low-temperature, solid-state nature of each process means that materials which are very difficult to join metallurgically using prior-art fusion approaches can be easily joined by the consolidation techniques disclosed herein. For example, copper and steel, which tend to crack when joined by fusion methods, can be readily consolidated using the invention, and the dot-wise approach may be used to add material of gradually varying compositions to produce objects with wide range of compositions. Furthermore, feed stocks of two widely disparate compositions can be applied in gradually varying amounts to produce a functionally gradient zone.

FIGS. 14a through 14c show how changes in composition may be effected during the fabrication of the object by the processes of the present invention. The layers may be deposited and consolidated by using the sheet, filament or dot-wise processes consolidation. FIG. 14a, for example, shows a discontinuous change from tool steel to copper. FIG. 14b shows a gradual change from molybdenum to copper using sheet or filament material of varying composition. FIG. 14c shows a functionally gradient material produced by the dot-wise application of two materials, A and B. The bottom layer is 100% material B, with successive layers incorporating an increasing number of dots of material A, until the top layer, comprising 100% of material A, is reached.

Sonotrodes applicable to the ultrasonic embodiment of the invention include applicator tips or points that first bond a segment of wire to previously deposited material, and then cut it, such as wire bonders. FIG. 15a shows a sonotrode with a cutting point against feedstock 450. Alternatively, a tool which cuts then bonds can be employed. FIG. 15b shows a sonotrode 4 cutting the feedstock 450 in two pieces and joining one piece 500 to the adjacent material. The geometry and motion of the sonotrode can be designed to shape as it bonds the material increments, as illustrated in FIG. 15c.

The invention is particularly useful in manufacturing structures used in aerospace applications, such as airframes and aircraft engine structural components. Titanium and titanium alloys, such as Ti-6Al-4V and Ti-5Al-2.5Sn are now used for such structures, but they are difficult to form and/or machine. The bonding of monolithic, composite or functionally gradient materials from feedstock including titanium alloys, niobium, rhenium, nickel-based alloys and other alloys of interest, can be used to bond sequentially strips, filaments or particles to produce dense objects for aerospace applications. In the case of the bonding of titanium, which does not form oxides at low temperature, a pressure of 1.5 to 2.5 ksi is sufficient to join 0.5 mm thick sheets at ultrasonic energy level of 2 kW, causing some atomic diffusion across the interface.

In addition to being suitable for the manufacture of prototype and production objects of conventional engineering dimensions, object consolidation according to the invention may be employed to produce miniature devices of various types. Examples include electronic components such as wiring, circuits, and micro-electromechanical (MEMs) devices which may incorporate miniaturized gears, beams, etc. to produce integrated devices such as sensors, or miniaturized actuators. This scale of fabrication is sometimes referred to a mesoscale manufacturing, to differentiate it from the "micro" manufacturing involved in transistors, integrated circuits, and so forth.

Object consolidation according to the invention is also well-suited to mesoscale manufacturing, since it is possible to fabricate very small, yet metallurgically bonded structures from a range of materials using this technique. In the case of ultrasonic bonding, a very high frequency power supply, preferably 60 kHz may be employed, along with a very fine wire feed stock using a miniaturized apparatus of the type illustrated in FIG. 9. Alternative applications for this type of object consolidation include MEMS, certain types of specialized electronics, and advanced wiring and sensor systems for automobiles, which are moving to more specialized electrical systems as vehicular electronic content increases. In addition, fabrication of tools and dies for very small scale forming processes such as stamping or micro-injection molding are well suited applications.

Resistance-Based Object Consolidation

Resistance heating and consolidation has several important advantages for solid free form fabrication. First, if the correct electrical and force parameters are selected, a joint can be produced in the solid or mushy state, without the presence of liquid metal. This reduces environmental and safety hazards in comparison to liquid metal processes, as well as the total amount of energy used by the process. Second, during resistance heating electrical energy is converted to thermal energy directly at the faying surface where it is being used to consolidate components, rather than at some remote location (such as a laser) from which it must be transferred to the object being built.

Third, since energy is generated directly at the faying surfaces, only the material immediately at the location being consolidated need be heated to the consolidation temperature. This reduces total energy usage, and, as important, total heat input. During layered manufacturing of metals using techniques such as shape melting and laser metal deposition, molten metal is generated and transported to the surface of the growing object. This creates more heat in the layered structure resulting in high residual stresses which can cause warping or cracking of the parts. Eliminating these stresses often requires annealing via furnace treatments or reheating using a power source such as a laser and which adds time, cost and complexity to the process.

A fourth advantage of the resistance joining approach to additive manufacturing is that compressive loads are used to create the bond at the faying surfaces. Electrical resistance heats the region being consolidated to the plastic zone, or mushy zones as required to join the material, and a compressive load is applied to effect a defect free joint. As a result, tensile residual stresses are reduced. In addition, compressive residual stresses can be deliberately produced in the surface in order to minimize total stress in the joint region when the next layer is placed.

If compressive stresses are deliberately induced in the surface of the growing structure as material is added, when tensile stresses are produced as a result of material addition, the overall stress in the part should be lower following processing than if a surface with a neutral stress state had been acted on by a process which imposes tensile residual stresses. This is similar to the principal on which processes such as shot peening operate; a compressive residual stress is induced in the surface of a part which will operate under a cyclic tensile stress. This serves to reduce the mean stress on the part, and extend its operating life in fatigue.

From the point of view of resistance joining technology, solid free form fabrication qualifies as a microresistance joining application. In order to achieve dimensional accuracy, it is desirable to use a small diameter wire, or thin foil material to apply increments of volume to the object being built, as in any additive manufacturing process. FIG. 17 illustrates a general approach to the application of a strip or wire to an object via resistance heating and pressure, similar to the approach shown in FIG. 9 with respect to ultrasonic bonding.

Maintaining a relatively constant current flow during resistance joining is critical to the consistent quality of the joints. Changes in current paths as the object geometry changes are well known to users of this process for sheet metal joining in industries such as appliance and automobile manufacturing. This phenomenon is known as "shunting." Shunting can reduce the effective current at the location of interest for joining causing poor quality or absent joints. In solid free form fabrication, the shape of the object is constantly changing, and electrical current flow will change with it. As a result, special means must be employed to ensure that sufficient heat is created at the interface to produce a quality joint. There are several possible methods available to accomplish this.

Figure 18:
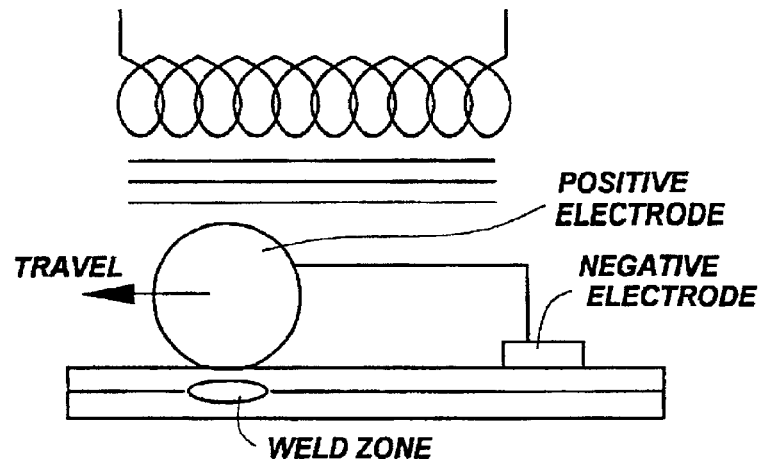
FIG. 18 is a drawing which shows how an electrode may travel immediately in front of a region being joined.
Figure 19:
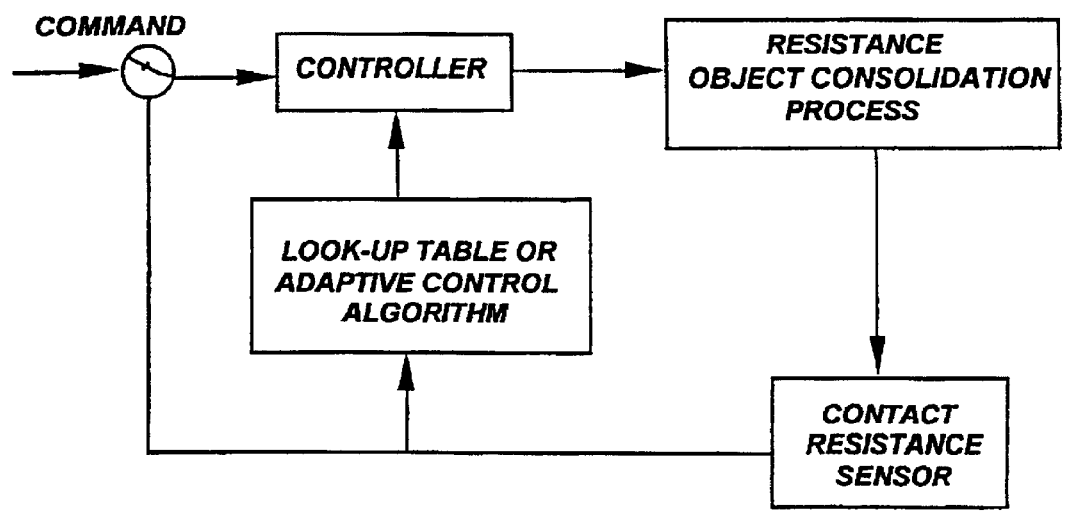
FIG. 19 is a block diagram which illustrates how deposition may be monitored in real time using an adaptive controller arrangement and look up table according to the invention.

One is to employ a traveling anode (or cathode), electrode to which electrons are flowing as they pass through the joint. This helps to maintain a more constant electrical path as the object shape changes. This electrode travels immediately in front of the region being joined, as illustrated in FIG. 18. A second method is to constantly measure the contact resistance at the interface between the previously deposited layer and the material being added at any instant. This is checked against a real time adaptive controller, or a look up table to adjust current and pressure as required to produce process conditions which ensure high quality consolidation at all times. A schematic illustration of this arrangement is shown in FIG. 19. A traveling electrode and a continuous contact resistance measurement arrangement are desirably combined to further enhance process consistency.

In the most common resistance spot welding processes, such as those usually employed in the manufacture of automobile bodies, or consumer appliances, a direct circuit is used. That is, a positively charged electrode transmits current to the work pieces, and a negative electrode facing it, returns the energy to close the electrical circuit. In the case of resistance object consolidation, an indirect weld circuit must be employed, as the constantly changing geometry of the object, lack of backside access, and growing thickness of the object, mean that it will be impossible to locate an electrode directly below the moving weld zone. In an indirect welding situation, the power return connection is arranged to accommodate a part geometry which does not permit the use of symmetrical, opposed electrodes. FIG. 18 illustrates schematically such an arrangement, which is suited to resistance object consolidation.

Although the illustrated embodiment employs a strip or tape feedstock, it will be evident to a reader skilled in the art that wires of various cross sections could be employed. In addition, a wheel having an eccentric cross section design to mash the added material, or create a desired surface contour or texture could be employed. Further variations would be apparent to those familiar with resistance welding technologies.

Resistance object consolidation also has certain advantages as a means of preparing functionally gradient, net shape objects, as discussed with reference to FIG. 14. Properly controlled resistance joining processes take place at temperatures below the melting point of the workpieces. There are many material systems where liquid phase metallurgical processes result in formation of intermetallics, brittle phases, immiscible liquids, etc. making it very difficult to produce functionally gradient materials using conventional fusion approaches. Some of the materials systems are well suited to resistance consolidation. However, it is important to have compatible electrical resistivity in the two materials. However, the methods described and illustrated here including micro-resistance seam, wire, and spot welding can readily be applied to creating the structures illustrated in FIG. 14 by one skilled in the art Object Consolidation Using Friction Consolidation FIG. 19 illustrates a frictional object consolidation embodiment according to the invention. Friction joining is also a solid state process with heat created directly at the faying surfaces and can be performed at temperatures significantly lower than the melting point of the feedstock and the base material. During friction joining, the material must achieve a state of high plasticity; in low hot strength materials this occurs at a lower fraction of the melting point than in materials which are intended to have significant structural strength at elevated temperatures. In general, joint temperatures reach 0.7 to 0.9 of the melting temperature during friction joining.

A consolidation process for additive fabrication of metal components which operates in the solid state, and in which heat is generated only at the surfaces that are to be joined, has enormous advantages over the obvious liquid-solid transformation solutions that have been pursued by others in the field. Because thermal energy is widely diffused in liquid-solid processes, residual stresses build up as new layers are deposited. This can result in curling and cracking, and residual stress relief of the objects must be performed. Frictional object consolidation creates heat only at the surface of the previously deposited material, and primarily at the plastically deforming zone of the new material applied; a layer only 20–100 microns thick. Thus, minimal heat is generated to produce residual stresses. Because frictional object consolidation occurs in the solid state in metals and plastics, it eliminates the safety and material handling problems which occur when liquid metals are present. In addition, by eliminating the liquid-solid phase transformation it allows dramatic improvements in dimensional accuracy when small material cross-sections are used.

In additive manufacturing, accuracy is a function of the size, thickness, and accuracy of placement of each increment of material added. Typically material is added in layers of 0.001 to 0.005" thickness in order to achieve the desired dimensional accuracy. For friction object consolidation, this requires that small diameter feedstocks be used, and that a material feeding technique which provides support to the small diameter wire be used.

Figure 20:
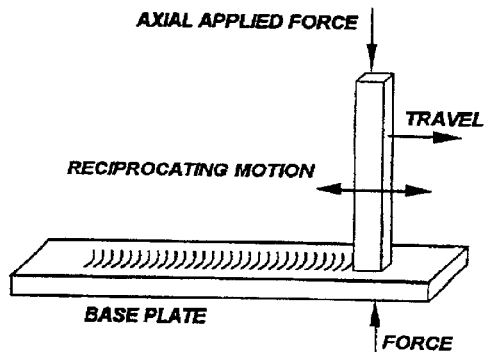
FIG. 20 is a simplified drawing seen from an oblique perspective wherein a feed stock is rotated with applied force to effect frictional bonding according to the invention.

Friction surfacing techniques are readily scaled down to support additive solid free form fabrication. For the purposes of net shape free form fabrication, it is desirable to minimize the cross section of the deposit material. This has two beneficial aspects; first it is a requirement for dimensional control. Second, as the cross section of the deposit material decreases, the applied load decreases as the square of the radius. I.e., suppose a load of 5,000 pounds is required to use a mild steel rod 1" in diameter as a friction surfacing material. A wire with a diameter of 0.1" will require a load of only 50 pounds to achieve the same force at the bonding surface. In order to prevent buckling, a feed head which continuously feeds the material, and limits the unsupported length of material between the material feed and the work surface is required. Such a system is illustrated in FIG. 20.

Figure 21:
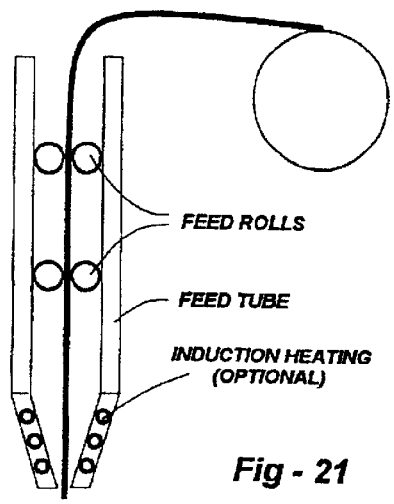
FIG. 21 is a drawing which shows a feed assembly with optional induction heating.
Figure 22:
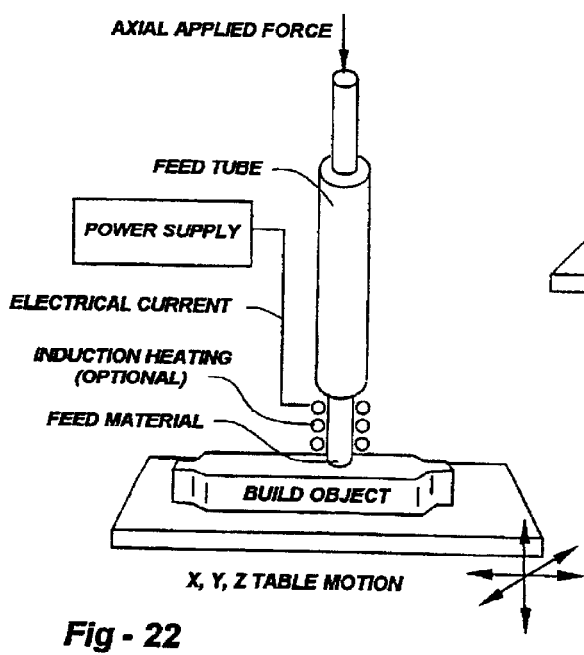
FIG. 22 is a simplified drawing which shows a friction joining apparatus employing a translating table motion.

Friction surfacing requires that the consumable material flow plastically under the applied load. By preheating the consumable material, the force required to induce plastic flow may be reduced. Thus the incorporation of resistance, induction or some other form of heating in the friction surfacing system may be valuable as illustrated in FIG. 21.

Monolithic or composite thermoplastic sheets, tapes and filaments can be consolidated using the same approaches described below for metals.

Figure 23:
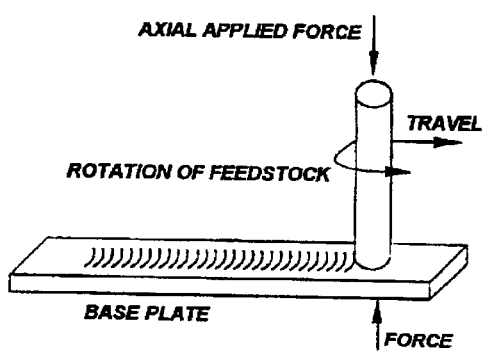
FIG. 23 is a simplified drawing showing how reciprocating motion may be used as opposed to a circular motion for bonding purposes.

Linear generation of friction energy provides a means of using friction bonding techniques to work with materials which do not have axi-symmetric cross sections. As a means of performing additive manufacturing, feedstocks possessing a rectangular cross section have advantages over circular feedstocks, since the location and width of the material applied can be more accurately controlled. In linear friction welding, the feedstock is moved reciprocally, as shown in FIG. 23. Friction joining can also be accomplished by orbital motion of a feedstock on a base plate, i.e., by rotation to and fro of the feedstock through a given angle which is less than 360 degrees.

Friction acoustic bonding is a related friction joining technology which is well suited to additive manufacturing. It is performed by exciting a tool which may be a disk, to vibrate at high frequencies (in the audible or ultrasonic range). When the tool transmits these high frequency vibrations under load through a material being added to a workpiece, friction occurs at the interface, and a joint can be formed. An additive manufacturing process employing such a technology, is illustrated in FIG. 24.

As with the alternative methodologies described herein, frictional joining may be practiced using a variety of feedstocks. For example, FIG. 24 illustrates this application of frictional object consolidation via friction acoustic bonding to additive manufacturing. Foil material can be supplied in sheets or fed from a roll. It can be consolidated into layers and cut according to the required geometry following consolidation, or it can be cut, then consolidated. Further, second materials can be applied around precut foils to supply a support structure. Because fully dense articles can be fabricated out of a single material without use of an adhesive, or secondary processing, this technology has major advantages over previously described art.

One particularly advantageous embodiment of frictional object consolidation using the friction acoustic bonding methods is in a tape lay up machine, as shown in FIG. 25. Use of 1–2" wide tapes instead of sheet material eliminates difficulties encountered in maintaining uniform tension across a wide sheet of feedstock, and also problems with ensuring uniform pressure and or energy is applied by a very wide wheel or roller. In addition, narrower tape roll are more easily handled by machines and human operators than wider, heavier feedstock supplies.

To a limited extent frictionally consolidated objects can be produced via a "dot wise" application. For example, the system can be designed so that individual dots of material smaller than a millimeter in diameter can be applied sequentially. This enables accurate build geometry, and, because friction bonding works with so many engineering metals, allows the fabrication of gradient compositions as described later. For example, using friction joining, iron (Fe) can be joined to both copper (Cu) and aluminum (Al) both of which create undesirable brittle phases when alloyed with iron and are very difficult to join with it, using conventional technologies.

However, by using dot wise application, an object composed of these three materials in virtually any composition desired could be fabricated. As in the tape application, a wire or tape feedstock, which could possess one of a variety of cross sections could be used to produce the articles. The friction application system would in essence smear tiny dots of material onto the build surface of the object, adding small increments of material with each cycle. Orbital material application lends itself readily to this type of application of friction additive manufacturing. A wire feed stock is supported by a feed tube, and a small amount of free material (approximately 0.002–0.008") is fed out of the tube. Because only a short unsupported volume of material is fed, buckling risk is minimized as a load is applied, and the wire is rotated to and fro through an angle of 45 to 135 degrees approximately. As plastic flow occurs (in 100 to 500 milliseconds) and a bond is produced between the feedstock and the build surface, the wire is retracted from the surface, leaving a dot of material. The feed tube indexes over to the next location and repeats the process.

Friction consolidation also enables the net shape fabrication of objects made from certain types of composite materials. For instance, the fabrication of continuously ceramic reinforced metal matrix composites has proven very difficult and costly using conventional metallurgical techniques. When exposed to molten metal, the ceramic fibers are typically subject to thermal shock, which causes cracking of the fibers, and results in reduced mechanical properties in the composites. Thus a further preferred embodiment of the invention illustrated in FIG. 11, which illustrates object consolidation to prepare continuously fiber reinforced metal matrix composite tapes or net shape objects. In the case of friction consolidation, a roller friction acoustic bonding system would be used to completely consolidate the material as illustrated in FIGS. 11, 12 and 12a.

FIG. 26 is an embodiment of frictional consolidation for overhaul and repair.

Overhaul and Repair

A further application and embodiment of friction consolidation to additive manufacturing lies in the overhaul and repair of existing objects, as shown in FIG. 28. In aerospace and military applications, power generation, tool and die fabrication, mining and certain food processing applications, components which are large, costly and unique may wear in service. Repair of such articles may be difficult using conventional weld build up techniques (particularly in military and aerospace applications where difficult to join materials are often used). However, total replacement of such components is often cost prohibitive. Because of the relatively low temperatures involved, friction consolidation is well suited to additive manufacturing applied to overhaul and repair. An automated dot-wise application system as described above can be used to add material in worn locations using CAD data to drive dot application locations.

Functionally Gradient Materials

Friction based additive manufacturing has certain benefits as a means of preparing functionally gradient, net shape objects in comparison to previous art. The low temperature, solid state nature of the process means that materials which are very difficult produce metallurgical bonds between using conventional fusion approaches can be easily joined. For example, copper and steel, which tends to crack when joined using fusion methods, can be consolidated using thermal energy produced via force and friction, as illustrated in FIG. 29. In addition, the dot-wise approach described above for friction object consolidation can be used to add material of many gradually varying compositions to themselves and each other to produce a wide range of compositions, or feed stocks of two widely disparate compositions can be applied in gradually varying amounts to produce a functionally gradient zone. Due to limitations on the diameter of feedstocks which can be used without causing buckling, a relatively coarse functionally gradient composite will be produced using the friction consolidation technique.

The methods illustrated in the previous to produce layered or point wise material application can be used in this application. Specifically, wires, filaments or sheets of varying composition (depending on the application method used as depicted above) can be employed as feedstocks, and selected and applied to result in various gradient compositions in the finished material.

I claim:

1. A method of fabricating an object through sequential material deposition, comprising the steps of:
   providing a description of the object to be fabricated;
   providing a material feedstock;
   forming the object by consolidating material increments in accordance with the description using a process that produces an atomically clean faying surface between the increments without melting the material in bulk; and
   removing any excess material.

2. The method of claim 1, wherein the process used to form the object involves ultrasonic, electrical resistance or frictional consolidation.

3. The method of claim 1, wherein the material is provided in the form of sheets, elongated tapes, filaments, dots or droplets.

4. The method of claim 1, wherein material increments define a discontinuous or gradual change in material composition.

5. The method of claim 1, wherein the description of the object is provided in the form of a computer-aided design or manufacturing (CAD/CAM) file.

6. The method of claim 1, wherein the process passes the energy through the material increment during the deposition thereof.

7. The method of claim 1, wherein the material is provided in the form of thin layers, and one or more of the layers are cut into a shape corresponding to the description of the object prior to the step of consolidating the layer.

8. The method of claim 1, wherein the material is provided in the form of thin layers, and one or more of the layers are consolidated then trimmed in accordance with the description of the object.

9. The method of claim 1, wherein the material is provided in the form of a plurality of thin layers which are consolidated one layer at a time.

10. The method of claim 1, wherein alternating layers of reinforcement fibers and metallic powders, foils, or a combination thereof, are used to fabricate a metal-matrix composite object.

11. The method of claim 10, further including the step of at least partially consolidating the metallic powder through laser-aided heating.

12. The method of claim 11, further including the step of fully consolidating the layers using ultrasonic, electrical resistance, or friction bonding.

13. The method of claim 10, wherein the fibers are continuous ceramic fibers.

14. The method of claim 10, wherein the object is a fiber-reinforced composite tape.

15. The method of claim 10, wherein the reinforcement fibers assume a direction determined by the description of the object.

16. The method of claim 10, wherein the reinforcement fibers cross each other in successive layers for added strength.

17. The method of claim 1, wherein:

the material is provided in the form of a tape having a width; and the description of the object takes the width of the tape into account.

18. The method of claim 1, wherein:

the object includes an overhanging, cantilevered or enclosed feature; and support material is used to support the feature.

19. The method of claim 18, wherein the support material has a melting point which is different than the material used to form the object.

20. The method of claim 19, wherein the support material is an alloy including solders, copper-based brazes, nickel-based brazes or titanium-based brazes.

21. The method of claim 18, wherein the support material is supplied in the form of tapes or sheets.

22. The method of claim 18, wherein the support material is roughened through mechanical or chemical processing.

23. The method of claim 18, wherein the support material is cut and placed to ensure that it can be shaken or otherwise easily removed from the object being fabricated.

24. The method of claim 18, wherein the support material is applied as a liquid, but hardens to produce a rigid support structure.

25. The method of claim 24, wherein slip-cast ceramics, freeze-cast ceramics, solgels, or hard, sufficiently high-melting point waxes are used as the support material.

26. The method of claim 1, further including the step of providing a computer-controlled actuation system operative to automatically place the material layers in position prior to consolidation.

27. The method of claim 1, wherein the object is a repair of an existing article.

28. A system for fabricating an object using sequential material deposition, comprising:

a memory for storing a description of the object;

a material feeder for providing material increments with faying surfaces therebetween;

a source of energy operative to produce an atomically clean faying surface between the material increments without melting the material in bulk; and a controller operative to coordinate the successive deposition of material increments through the material feeder and control the source of energy to consolidate the material in accordance with the description of the object.

29. The system of claim 28, wherein the energy source uses ultrasonic, electrical, resistance, or frictional energy.

30. The system of claim 28, further including an actuation system for imparting relative motion between the material feeder and energy source.

31. The system of claim 28, further including a material-removing unit for removing excess material not required to form the object.

32. The system of claim 31, wherein the material-removing unit includes a knife, drill, laser beam, milling machine or ultrasonic machining tool.

33. The system of claim 31, wherein the feeder is operative to provide the material in the form of sheets, tapes, filaments, dots or droplets.

34. The system of claim 31, further including:

a support-material feeder, and a support-material removing unit for removing excess support material not required to form the object.

35. The system of claim 31, wherein the object is a repair to an existing article.

* * * * *